United States Patent [19]
Larson

[11] Patent Number: 5,564,810
[45] Date of Patent: Oct. 15, 1996

[54] FULL COLOR STEREOSCOPIC DISPLAY WITH COLOR MULTIPLEXING

[75] Inventor: Brent D. Larson, Cave Creek, Ariz.

[73] Assignee: Honeywell Inc., Minneapolis, Minn.

[21] Appl. No.: 999,051

[22] Filed: Dec. 31, 1992

[51] Int. Cl.⁶ ............................ G03B 21/00; H04N 13/00
[52] U.S. Cl. .................... 353/8; 353/31; 359/464
[58] Field of Search ............................ 353/8, 7, 20, 30, 353/31, 84; 359/464, 465, 466, 478; 358/3, 88, 89, 90, 91, 92; 348/42, 43, 51, 57, 60

[56] References Cited

U.S. PATENT DOCUMENTS

| 4,719,507 | 1/1988 | Bos ............................ 358/92 |
| 4,792,850 | 12/1988 | Liptoh et al. .................. 353/8 |
| 4,877,307 | 10/1989 | Kalmanash ..................... 358/92 |
| 4,954,890 | 9/1990 | Park ........................... 358/92 |
| 4,995,718 | 2/1991 | Jachimowicz et al. ............ 353/31 |
| 5,029,988 | 7/1991 | Urion . |

FOREIGN PATENT DOCUMENTS

| 0349692A2 | 1/1990 | European Pat. Off. . |
| 0144516 | 6/1990 | Japan ......................... 353/8 |
| 91/0313 | 3/1991 | WIPO . |

OTHER PUBLICATIONS

K. Jachimowicz et al., "Stereoscopic (3–D) Projection Display Using Polarized Color Multiplexing," Aug. 1990, in *Optical Engineering*, vol. 29 No. 8, pp. 838–842.

M. Schadt et al., "Novel Polarized Liquid–Crystal Color Projection and New TN–LCD Operating Modes," May 15–17, 1990, in *Society for Information Display Int'l Symposium*, Digest of Tech. papers, vol. XXI, pp. 838–842.

R. Maurer et al., "Polarizing Color Filters Made From Cholesteric LC Silicones," May 15–17, 1990, in *Society for Information Display Int'l Symposium*, Digest of Technical papers, vol. XXI, pp. 110–113.

Primary Examiner—William C. Dowling
Attorney, Agent, or Firm—John G. Shudy, Jr.

[57] ABSTRACT

A full color stereoscopic display having polarizers for color multiplexing and effecting three-dimensional full color viewing from a single direct view display. Color polarization of color images provides the basis for discriminating the different perspectives of three-dimensional images. Polarization may be linear or circular. The viewer may perceive three-dimensional images with merely the aid of polarized glasses.

11 Claims, 1 Drawing Sheet

FULL COLOR STEREOSCOPIC DISPLAY WITH COLOR MULTIPLEXING

BACKGROUND OF THE INVENTION

The present invention pertains to stereoscopic direct view color displays. More particularly, the invention pertains to color multiplexed stereoscopic direct view displays.

Numerous methods have been proposed for providing stereoscopic information with color display devices. One such method is disclosed in U.S. Pat. No. 4,995,718 which discloses a color multiplexing technique for projection displays. U.S. Pat. No. 4,995,718, by K. Jachimowicz et al., issued Feb. 26, 1991, is hereby incorporated by reference. Color channels are selectively polarized in Jachimowicz et al., prior to combination of the color channels via standard projection methods.

SUMMARY OF THE INVENTION

The present invention is a stereoscopic method that achieves channel separation of the various views by switchable colored filters, preferably involving colored polarizers. This enables channel separation to be done with nearly any kind of color display, including direct view devices such as shadow mask cathode-ray tubes, flat panel liquid crystal displays, and electroluminescent panels. The present invention also applies to unmodified color projection displays, since polarizing means need not be added to the image sources prior to combining the image sources, as referred to in the above noted patent. Present invention is an improvement over that disclosed in the related-art patent.

DESCRIPTION OF THE PREFERRED EMBODIMENT

Figure 1:
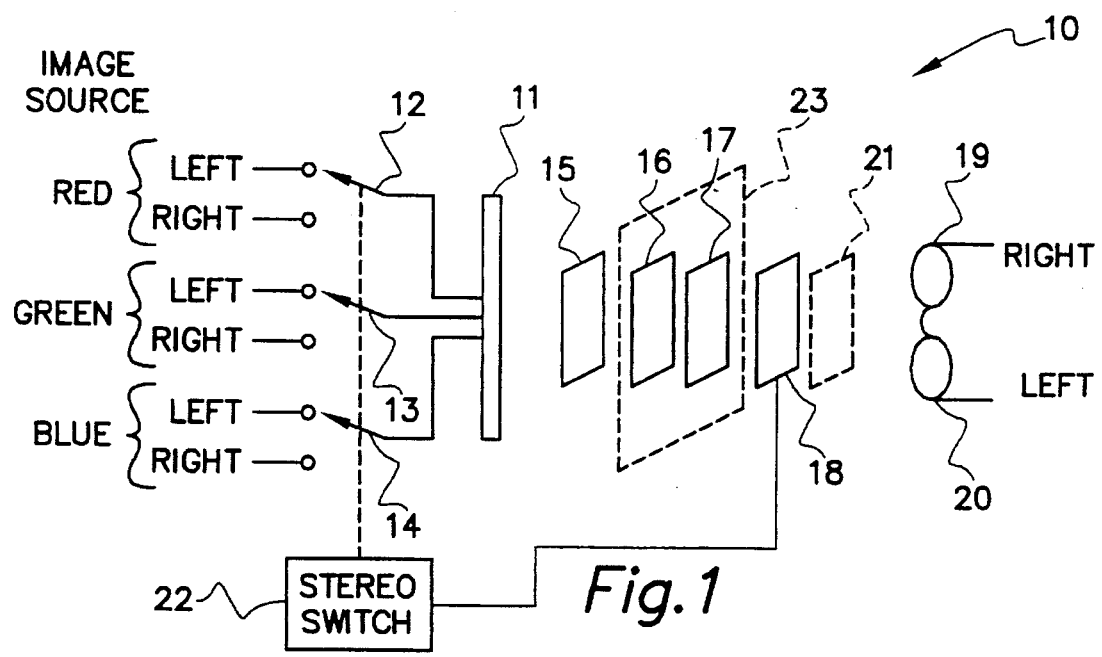
FIG. 1 shows the basic layout of a full-color stereoscopic display system.

FIG. 1 reveals the basic layout of stereoscopic system 10. Image source 11, such as a cathode ray tube or liquid crystal display, provides a full color image. Image switches 12, 13 and 14 control the data from two separate data channels representing two perspectives, left and right, of the displayed image. Red image data for left and right perspectives is conveyed to switch 12. Green image data of left and right perspectives is presented to switch 13. Blue image data of left and right perspectives is presented to switch 14. Switches 12, 13 and 14 may select left or right perspectives of the respective image data. For instance, switch 12 and switch 14 at one moment receive data for the left perspective of the red and blue images, respectively. At the same time, switch 13 receives data from the right perspective of green image data. Switches 12, 13 and 14 synchronously switch perspectives, in accord with stereo switch 22. When switches 12 and 14 are receiving data of the right perspective from the red and blue images, switch 13 is receiving data of the left perspective of the green image. The data from the red, green and blue images are simultaneously presented to a display 11. Display 11 present one perspective of the blue and red images and the other perspective of the green image. Colored polarizers 15, 16 and 17 polarize each color bin of the green, red and blue images, respectively. The color bins, respectively, are green, red and blue. As noted, red and blue, i.e., magenta, data are from one stereoscopic channel and the green data is from the other. The image switches 12, 13 and 14, are toggled at the display's frame or field rate, depending upon such parameters as response time and interlace factor, if any. Colored polarizers 15, 16 and 17 are magenta, cyan and yellow for polarizing the green, red and blue color bands, respectively. The polarization axis of the magenta polarizer is orthogonal to the cyan and yellow polarizers. Polarizers 15, 16 and 17 may be circular instead of linear. In the circular case, the magenta polarizer has a direction different from that of the cyan and yellow polarizers (e.g., right circular versus left circular). The image from display 11 after passing through polarizers 15, 16 and 17, passes through a polarization rotator such as a variable retarder 18. Retarder 18 periodically rotates the polarization of each color band, red, green and blue, between two orthogonal polarization states, or changes the direction of the circular polarization. Retarder 18 may be a TEKTRONIX pi cell, a ferroelectric liquid crystal, a twisted nematic liquid crystal cell, an electro-optic ceramic (e.g., PLZT), or any other device or assembly which produces a effective differential retardation of one-half wave. In the case of linear polarizing, the axis of retarder 18 is normally situated at 45 degrees relative to the polarization axes of polarizers 15, 16 and 17. Neutral analyzer polarizers 19 and 20 select which color beams are to be seen by each of the viewer's eyes. Thus, the left and right eyes see the left and right perspectives of the image. Each of the perspectives alternate between the magenta (i.e., red and blue) and green images, bands or components. Retarder 18 is electronically switched in synchronism by stereo switch 22, with switches 12, 13 and 14 to provide the alternation of the green magenta images for the corresponding perspectives to each eye. The perception of flicker by the viewer is minimized without any increase in system bandwidth. This minimization holds particularly for non-saturated colors as, for instance, the luminance of the green and magenta components are comparable. The degree of flicker reduction is dependent upon the displayed data, display luminance, field and frame rate, ambient lighting, and other parameters. The present invention has only one (optical) source of images. Despite having only a sole source, the original spatial resolution of the display or screen as a non-interlaced device is preserved. Further, the screen is not split. Thus, in the case of a 60 hertz display, a 60 hertz time sequential presentation of images is possible.

Each of the polarizers 15, 16 and 17, ideally removes only a single polarization of its respective color band, thereby allowing all of the other light of the other color bands to pass unaffected. For example, magenta polarizer 15 removes half of the green light but does not affect the red or blue light. Likewise, cyan polarizer removes half of the red light but does not affect the green or blue light, and yellow polarizer 17 removes half of the blue light but does not affect the red or green light. Polarizers 15, 16 and 17 may be absorption mode polarizers. An example is a polarizer having a dichroic dye oriented by a stretched polymer or other means. Alternatively, cholesteric liquid crystal or cross-linked polymers may be used as polarizers 15, 16 and 17. The latter polarizers function as circular polarizers, wherein polarizer 15 may have a circular polarization direction opposite of that of polarizers 16 and 17. Polarizers 15, 16 and 17 may instead be thin film polarizers, prism polarizers or other types of polarizers.

Neutral analyzer polarizers 19 and 20, which are polarization optics, may be goggles or eyeglasses, similar to other kinds of available stereoscopic goggles or eye glasses. Analyzer polarizers 19 and 20 typically are separate from display 11, but as an option all elements can be separate from display 11. If polarizers 19 and 20 are preferred to be circular polarizers, and polarizers 15, 16 and 17 are linear polarizers, then a quarter wave retarder 21 may be inserted between polarizers 19 and 20, and pi cell 18.

To minimize cross talk between the left and right channels, color notch filters may be added to system 10 to minimize the overlap in the magenta and green signal output spectra. Residual cross talk between the left and right channels can be reduced further by electronic comparison of the two-channel data by taking into consideration the spectral overlap, switching speed, phosphor decay, non-ideal retarder or polarizer performance and other effects of concern, and applying appropriate compensation. Typically, complete compensation is possible in the mid tones; however, some ghosting may be detectable in areas of the image having very high contrast.

Figure 2:
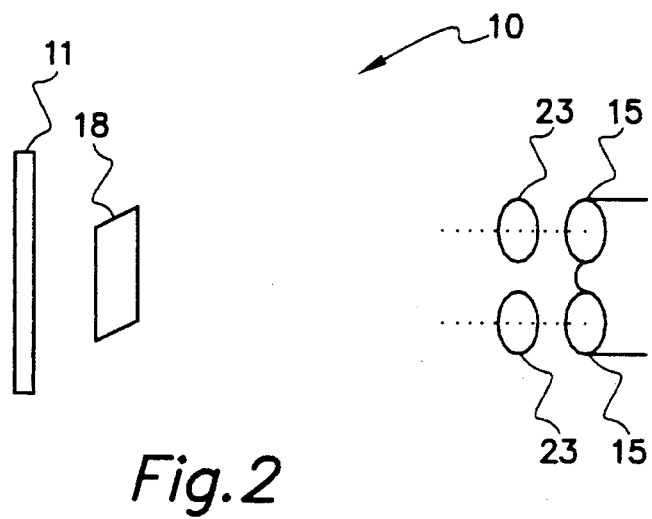
FIG. 2 reveals the display system having two color polarizers.

Alternate configurations of the invention exist. For instance, the polarized output of a flat panel liquid crystal display 11 may go directly into a pi cell 18. Then the image could be viewed through crossed magenta polarizer 15 and a green polarizer 23 which could be a combination of cyan and yellow polarizers 16 and 17, as illustrated in FIG. 2, with polarized displays such as liquid crystal displays. The green colored polarizer polarizes the red and blue light, and thus appears green. The colored polarizer pair for the left eye would pass the orthogonal polarizations states from those for the right eye. A configuration having only polarizers 15 and 23 for each eye piece would be evident.

Figure 3:
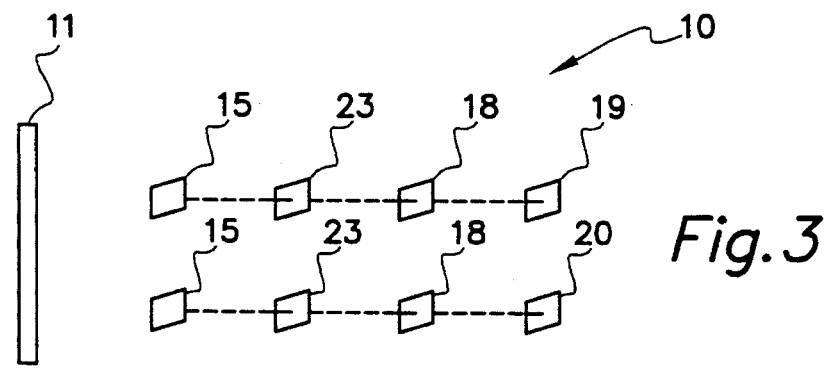
FIG. 3 illustrates the display system having separate components for each perspective of the displayed image.

There may be alternate arrangements, configurations, types and orders of the polarizers, waveplate and retarder. For example, the entire polarizer assembly may be in a self-contained goggle form. Also, there may be alternate color schemes. The color polarizers may be switchable, mechanically or electronically. There may be mechanical or electronic color filter wheels or other kinds of color filters. There may be switched polarizers such as dichroic liquid crystal devices (LCD's). There may be polarized displays such as LCD's or certain projection displays. All the elements of display system 10, between the observer and the display, may be incorporated in the observer's eyeglasses or goggles, for unpolarized displays, as illustrated in FIG. 3. Elements 15 and 23 for one eye are rotated 90 degrees relative to elements 15 and 23 for the other eye.

Tests using dichroic (i.e., absorbing) polarizers, a pi cell and a shadow mask color cathode-ray tube monitor, show a moderate amount of stereo separation between the left and right image channels. Improvements may be made with spectral matching polarizer purity (e.g., using cholesteric polarizers) and electronic compensation.

This invention provides color multiplexing that is compatible with unmodified direct view and projection displays, including consumer cathode ray tubes and computer monitors. The quality of the resulting stereoscopic images depends upon the display parameters and the degree of implementation of improvement techniques.

I claim:

1. A color stereoscopic display comprising:

display means for simultaneously providing images of a first color and images of a second color, wherein the images of the first color alternate between first and second perspectives and the images of the second color alternate between second and first perspectives, such that when images of the first color have one perspective, the images of the second color have the other perspective;

first polarizing means, situated proximate to said display means, for polarizing light of images of the first color into a first polarization;

second polarizing means, situated proximate to said display means, for polarizing light of images of the second color into a second polarization;

variable retarding means, situated proximate to the display means, for alternately and periodically changing the first polarization of light of images of the first color into the second polarization, and periodically changing the second polarization of light of images of the second color into the first polarization, wherein said retarding means is synchronized with the alternation of the first and second perspectives of the images of the first color and second color such that the first perspective continually is of the first polarization, and that the second perspective continually is of the second polarization; and constant retarding means, proximate to said variable retarding means, for converting said first and second polarizations into third and fourth polarizations, respectively.

2. The display of claim 1 wherein:

said first and second polarizing means, variable retarding means, and constant retarding means are situated between said display means and an observer; and the observer has a first eyepiece proximate to one eye, that passes light of only a third polarization, and a second eyepiece proximate another eye, that passes light of only a fourth polarization, enabling the observer to sense the first perspective with the one eye and to sense the second perspective with the other eye, thereby enabling the observer to perceive three-dimensional color images from said display means.

3. A color stereoscopic display comprising:

display means for simultaneously providing images of a first color and images of a second color, wherein the images of the first color alternate between first and second perspectives and the images of the second color alternate between second and first perspectives, such that when images of the first color have one perspective, the images of the second color have the other perspective;

first polarizing means, situated proximate to said display means, for polarizing light of images of the first color into a first polarization;

second polarizing means, situated proximate to said display means, for polarizing light of images of the second color into a second polarization;

variable retarding means, situated proximate to the display means, for alternately and periodically changing the first polarization of light of images of the first color into the second polarization, and periodically changing the second polarization of light of images of the second color into the first polarization, wherein said retarding means is synchronized with the alternation of the first and second perspectives of the images of the first color and second color such that the first perspective continually is of the first polarization, and that the second perspective continually is of the second polarization; and a constant retarding means, proximate to said variable retarding means, for converting said first and second polarizations into third and fourth polarizations, respectively.

4. The display of claim 3 wherein:

said first and second polarizing means, variable retarding means, and constant retarding means are situated between said display means and an observer; and the observer has a first eyepiece proximate to one eye, that passes light of only a third polarization, and a second eyepiece proximate to another eye, that passes light of only a fourth polarization, enabling the observer to sense the first perspective with the one eye and to sense the second perspective with the other eye, thereby enabling the observer to perceive three-dimensional color images from said display means.

5. A color stereoscopic display comprising:

an image source;

a display connected to said image source, said display providing images of a first color and images of a second color, the images of the first color having first and second perspectives for presenting stereoscopic visual information, the images of the second color having first and second perspectives for presenting stereoscopic visual information, the images of the first color exhibiting one perspective at a time and the images of the second color exhibiting one perspective at a time, and the images of the first color and the images of the second color exhibiting different perspectives at a time, and the images of the first color and second color alternating periodically between first and second perspectives;

a first color polarizer situated on said display, said first color polarizer polarizing images of the first color to a first polarization;

a second color polarizer situated on said first color polarizer, said second color polarizer polarizing images of the second color to a second polarization; and a variable retarder situated on said second color polarizer, said variable retarder periodically changing the first polarization of the images of the first color to the second polarization and changing the second polarization of the images of the second color to the first polarization, in synchronism with the alternation of the images of the first color and of the second color between first and second perspectives such that all images of the first perspective passing through said variable retarder have one polarization and all images of the second perspective passing through said variable retarder have another polarization; and wherein:
the images of the first color are images of a green color;
the images of the second color are images of a red color and of a blue color; and
said first color polarizer polarizes images of the green color;
said second polarizer comprises:
a third color polarizer for polarizing images of the red color; and
a fourth color polarizer for polarizing images of the blue color;
said display comprises:
a first red image source having the first perspective;
a second red image source having the second perspective;
a first blue image source having the first perspective;
a second blue image source having the second perspective;
a first green image source having the first perspective;
a second green image source having the second perspective;
a display screen;
a first switch for connecting said display screen to either said first red image source or said second red image source;
a second switch for connecting said display screen to either said first blue image source or to said second blue image source; and
a third switch for connecting said display screen to either said first green image source or to said second green image source; and
wherein:
when said first and second switches connect said display screen to said first red and blue image sources, respectively, then said third switch connects said display screen to said second green image source;
when said third switch connects said display screen to said first green image source, then said first and second switches connect said display screen to said second red and blue image sources, respectively;
the first polarization is a first linear polarization;
the second polarization is a second linear polarization; and
the first linear polarization and the second linear polarization are orthogonal relative to each other; and further comprising:
a quarter-wave plate situated on said variable retarder; and
wherein:
the first linear polarization is converted by said variable retarder to a first circular polarization;
the second linear polarization is converted by said variable retarder to a second circular polarization; and
an observer, wearing glasses having one first circularly polarized lens and having one second circularly polarized lens, sees the first perspective with one eye and the second perspective with the other eye, thereby being capable of perceiving full color stereoscopic images.

6. A color stereoscopic display comprising:

display means for simultaneously providing images of a first color and images of a second color, wherein the images of the first color alternate between first and second perspectives and the images of the second color alternate between second and first perspectives, such that when images of the first color have one perspective, the images of the second color have the other perspective;

polarizing means, situated between said display means and an observer, for polarizing light of images of the first color into a first polarization and for polarizing light of images of the second color into a second polarization;

variable retarding means, situated between said display means and the observer, for alternately and periodically changing the first polarization of light of images of the first color into the second polarization, and periodically changing the second polarization of light of images of the second color into the first polarization, wherein said retarding means is synchronized with the alternation of the first and second perspectives of the images of the first color and second color such that the first perspective continually is of the first polarization, and that the second perspective continually is of the second polarization; and a constant retarding means, proximate to said variable retarding means, for converting said first and second polarizations into third and fourth polarizations, respectively.

7. The display of claim 6 wherein said polarizing means and said retarding means are incorporated in a set of eyepieces to be worn by the observer.

8. The display of claim 6 wherein said polarizing means and said retarding means are incorporated in said display means.

9. A color stereoscopic display comprising:

an image source;

a display connected to said image source, said display providing images of a first color, green, and images of a second color, red and blue, the images of the first color having first and second perspectives for presenting stereoscopic visual information, the images of the second color having first and second perspectives for presenting stereoscopic visual information, the images of the first color exhibiting one perspective at a time and the images of the second color exhibiting one perspective at a time, and the images of the first color and the images of the second color exhibiting different perspectives at a time, and the images of the first color and second color alternating periodically between first and second perspectives;

a first color polarizer situated on said display, said first color polarizer polarizing images of the first color, green, to a first polarization;

a second color polarizer situated on said first color polarizer, said second color polarizer polarizing images of the second color to a second polarization, comprising:
a third color polarizer for polarizing images of the red color; and
a fourth color polarizer for polarizing images of the blue color; and a variable retarder situated on said second color polarizer, said variable retarder periodically changing the first polarization of the images of the first color to the second polarization and changing the second polarization of the images of the second color to the first polarization, in synchronism with the alternation of the images of the first color and of the second color between first and second perspectives such that all images of the first perspective passing through said variable retarder have one polarization and all images of the second perspective passing through said variable retarder have another polarization; and wherein:
said display comprises:
a first red image source having the first perspective;
a second red image source having the second perspective;
a first blue image source having the first perspective;
a second blue image source having the second perspective;
a first green image source having the first perspective;
a second green image source having the second perspective;

a display screen;
a first switch for connecting said display screen to either said first red image source or said second red image source;
a second switch for connecting said display screen to either said first blue image source or to said second blue image source; and
a third switch for connecting said display screen to either said first green image source or to said second green image source;
when said first and second switches connect said display screen to said first red and blue image sources, respectively, then said third switch connects said display screen to said second green image source;
when said third switch connects said display screen to said first green image source, then said first and second switches connect said display screen to said second red and blue image sources, respectively;
the first polarization is a first linear polarization;
the second polarization is a second linear polarization;
the first linear polarization and the second linear polarization are orthogonal relative to each other;
the display further comprises a quarter-wave plate situated on said variable retarder;
the first linear polarization is converted by said variable retarder to a first circular polarization;
the second linear polarization is converted by said variable retarder to a second circular polarization; and
an observer, wearing glasses having a first circularly polarized lens and having a second circularly polarized lens, sees the first perspective with one eye and the second perspective with the other eye, thereby being capable of perceiving full color stereoscopic images.

10. A color stereoscopic display comprising:

an image source;

a display connected to said image source, said display providing images of a first color, red, and images of a second color, green and blue, the images of the first color having first and second perspectives for presenting stereoscopic visual information, the images of the second color having first and second perspectives for presenting stereoscopic visual information, the images of the first color exhibiting one perspective at a time and the images of the second color exhibiting one perspective at a time, and the images of the first color and the images of the second color exhibiting different perspectives at a time, and the images of the first color and second color alternating periodically between first and second perspectives;

a first color polarizer situated on said display, said first color polarizer polarizing images of the first color, red, to a first polarization;

a second color polarizer situated on said first color polarizer, said second color polarizer polarizing images of the second color to a second polarization comprising:
a third color polarizer for polarizing images of the green color; and
a fourth color polarizer for polarizing images of the blue color; and a variable retarder situated on said second color polarizer, said variable retarder periodically changing the first polarization of the images of the first color to the second polarization and changing the second polarization of the images of the second color to the first polarization, in synchronism with the alternation of the images of the first color and of the second color between first and second perspectives such that all images of the first perspective passing through said variable retarder have one polarization and all images of the second perspective passing through said variable retarder have another polarization; and wherein:
said display comprises:
a first red image source having the first perspective;
a second red image source having the second perspective;
a first blue image source having the first perspective;
a second blue image source having the second perspective;
a first green image source having the first perspective;
a second green image source having the second perspective;
a display screen;
a first switch for connecting said display screen to either said first red image source or said second red image source;
a second switch for connecting said display screen to either said first blue image source or to said second blue image source; and
a third switch for connecting said display screen to either said first green image source or to said second green image source; and
when said first and second switches connect said display screen to said first red and blue image sources, respectively, then said third switch connects said display screen to said second green image source;
when said third switch connects said display screen to said first green image source, then said first and second switches connect said display screen to said second red and blue image sources, respectively;
the first polarization is a first linear polarization;
the second polarization is a second linear polarization;
the first linear polarization and the second linear polarization are orthogonal relative to each other;
said display further comprises a quarter-wave plate situated on said variable retarder;
the first linear polarization is converted by said variable retarder to a first circular polarization;
the second linear polarization is converted by said variable retarder to a second circular polarization; and
an observer, wearing glasses having a first circularly polarized lens and having a second circularly polarized lens, sees the first perspective with one eye and the second perspective with the other eye, thereby being capable of perceiving full color stereoscopic images.

11. A color stereoscopic display comprising:
an image source;
a display connected to said image source, said display providing images of a first color, blue, and images of a second color, red and green, the images of the first color having first and second perspectives for presenting stereoscopic visual information, the images of the second color having first and second perspectives for presenting stereoscopic visual information, the images of the first color exhibiting one perspective at a time and the images of the second color exhibiting one perspective at a time, and the images of the first color and the images of the second color exhibiting different perspectives at a time, and the images of the first color and second color alternating periodically between first and second perspectives;

a first color polarizer situated on said display, said first color polarizer polarizing images of the first color, blue, to a first polarization;

a second color polarizer situated on said first color polarizer, said second color polarizer polarizing images of the second color to a second polarization, comprising:
a third color polarizer for polarizing images of the red color; and
a fourth color polarizer for polarizing images of the green color; and a variable retarder situated on said second color polarizer, said variable retarder periodically changing the first polarization of the images of the first color to the second polarization and changing the second polarization of the images of the second color to the first polarization, in synchronism with the alternation of the images of the first color and of the second color between first and second perspectives such that all images of the first perspective passing through said variable retarder have one polarization and all images of the second perspective passing through said variable retarder have another polarization; and wherein:
said display comprises:
a first red image source having the first perspective;
a second red image source having the second perspective;
a first blue image source having the first perspective;
a second blue image source having the second perspective;
a first green image source having the first perspective;
a second green image source having the second perspective;
a display screen;
a first switch for connecting said display screen to either said first red image source or said second red image source;
a second switch for connecting said display screen to either said first blue image source or to said second blue image source; and
a third switch for connecting said display screen to either said first green image source or to said second green image source;
when said first and second switches connect said display screen to said first red and blue image sources, respectively, then said third switch connects said display screen to said second green image source;
when said third switch connects said display screen to said first green image source, then said first and second switches connect said display screen to said second red and blue image sources, respectively;

the first polarization is a first linear polarization;

the second polarization is a second linear polarization;

the first linear polarization and the second linear polarization are orthogonal relative to each other;

said display further comprises:

a quarter-wave plate situated on said variable retarder;

the first linear polarization is converted by said variable retarder to a first circular polarization;

the second linear polarization is converted by said variable retarder to a second circular polarization; and an observer, wearing glasses having a first circularly polarized lens and having a second circularly polarized lens, sees the first perspective with one eye and the second perspective with the other eye, thereby being capable of perceiving full color stereoscopic images.

* * * * *